(12) United States Patent
Zhu et al.

(10) Patent No.: US 7,593,697 B2
(45) Date of Patent: *Sep. 22, 2009

(54) ADAPTIVE CODING AND MODULATION

(75) Inventors: Peiying Zhu, Kanata (CA); Wen Tong, Ottawa (CA); Claude C. Royer, Hull (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/403,353

(22) Filed: Apr. 13, 2006

(65) Prior Publication Data
US 2006/0182026 A1 Aug. 17, 2006

Related U.S. Application Data

(63) Continuation of application No. 10/161,913, filed on Jun. 4, 2002, now Pat. No. 7,043,210.

(60) Provisional application No. 60/296,099, filed on Jun. 5, 2001.

(51) Int. Cl.
*H04B 1/66* (2006.01)
*H04L 1/18* (2006.01)
*H04J 9/00* (2006.01)

(52) U.S. Cl. .................. 455/102; 455/108; 455/110; 714/748; 370/204

(58) Field of Classification Search ............. 455/101, 455/102, 108, 110; 704/748, 749
See application file for complete search history.

(56) References Cited

U.S. PATENT DOCUMENTS 4,700,363 A 10/1987 Tomlinson et al.
5,197,061 A 3/1993 Halbert-Lassalle et al.
5,502,744 A * 3/1996 Marshall ................ 375/259
5,828,677 A 10/1998 Sayeed et al.

(Continued)

FOREIGN PATENT DOCUMENTS

DE 197 05 354 A1 8/1998

OTHER PUBLICATIONS

Samsung Electronics, "Enhanced Symbol Mapping method for the modulation of Turbo-coded bits based on bit priority," 3GPP TSG RAN WG1/WG2 Joint meeting on HSDPA, Apr. 2001.

(Continued)

*Primary Examiner*—Duc M Nguyen
(74) *Attorney, Agent, or Firm*—Withrow & Terranova, P.L.L.C.

(57) ABSTRACT

The present invention provides a unique feedback system in a wireless communication system wherein the transmission channel is always overloaded with data, which is configured and modulated at a select order of modulation. Based on the channel conditions, only a portion of the data can be successfully received. As such, the receiver will attempt to receive the data using demodulation techniques corresponding to the different levels of modulation used to encode the data transmitted. The receiver will determine the data that is recovered, or the highest order of modulation at which the data is recovered, and provide feedback to the transmitter. The transmitter will then retransmit the data that was not properly received. By overloading the channel at all times, the maximum amount of data capable of being transmitted over the channel is optimized without requiring or heavily relying on the receiver feeding back channel condition information to the transmitter.

20 Claims, 7 Drawing Sheets

U.S. PATENT DOCUMENTS

| | | | |
|---|---|---|---|
| 6,014,568 | A | 1/2000 | Alperovich et al. |
| 6,141,353 | A | 10/2000 | Li |
| 6,181,686 | B1 | 1/2001 | Hamalainen et al. |
| 6,292,512 | B1* | 9/2001 | Radha et al. ............. 375/240.1 |
| 6,367,045 | B1 | 4/2002 | Khan et al. |
| 6,487,220 | B2 | 11/2002 | Matsuzaki et al. |
| 6,519,731 | B1 | 2/2003 | Huang et al. |
| 6,529,730 | B1 | 3/2003 | Komaili et al. |
| 6,567,375 | B2* | 5/2003 | Balachandran et al. ...... 370/204 |
| 6,574,211 | B2 | 6/2003 | Padovani et al. |
| 6,701,129 | B1* | 3/2004 | Hashem et al. .......... 455/67.11 |
| 6,704,368 | B1 | 3/2004 | Nefedov |
| 6,704,898 | B1* | 3/2004 | Furuskar et al. ............. 714/751 |
| 6,744,738 | B1 | 6/2004 | Park et al. |
| 6,836,515 | B1 | 12/2004 | Kay et al. |
| 2002/0155850 | A1* | 10/2002 | Haartsen ..................... 455/502 |
| 2002/0172192 | A1 | 11/2002 | Hunzinger et al. |
| 2003/0072376 | A1* | 4/2003 | Krishnamachari et al. ..................... 375/240.26 |

OTHER PUBLICATIONS

R1-01-0739, Samsung Electronics, "Simulation results of Chase Combining with Symbol Mapping Based on Bit Priority," 3GPP TSG RAN WG1 AdHoc, Espoo, Finland, Jun. 2001.

XP-001093480, Scharr et al., "A Hybrid Temporal-SNR Fine-Granular Scalability for Internet Video," IEEE, 2001.

Zhou, Yi et al., "The Description and Verification of a Hybrid GBN-SR Protocol Using Pr/T Nets," Computer Engineering, vol. 21, No. 6, Nov. 1995. Translated Abstract Only.

* cited by examiner

ADAPTIVE CODING AND MODULATION

This application claims the benefit of provisional application Ser. No. 60/296,099, filed Jun. 5, 2001, the disclosure of which is hereby incorporated by reference in its entirety.

FIELD OF THE INVENTION

The present invention relates to controlling adaptive coding and modulation in wireless communication environments, and in particular to providing such control without relying on channel quality estimates.

BACKGROUND OF THE INVENTION

Many wireless communication systems dynamically change coding and modulation techniques in an effort to maximize data rates in light of changing channel conditions. In general, data rates decrease and the coding and modulation techniques are more robust as channel conditions degrade, and vice versa. Traditionally, coding and modulation schemes for transmission have been controlled based on channel quality estimates measured at a receiver and fed back to the transmitter. Unfortunately, channel quality often changes significantly in a short period of time, and the time necessary to estimate channel quality, feed these estimates back to the transmitter, and allow the transmitter to react, injects a delay in the feedback sufficient enough to make the channel quality estimates obsolete in many instances. For example, if a high quality channel quickly degrades to a significant extent, the transmitter may rely on the high channel quality estimates provided by the receiver and select a coding and modulation scheme substantially incompatible with the recently degraded channel. The result is lost data and the need for retransmission of all data.

Figure 1:
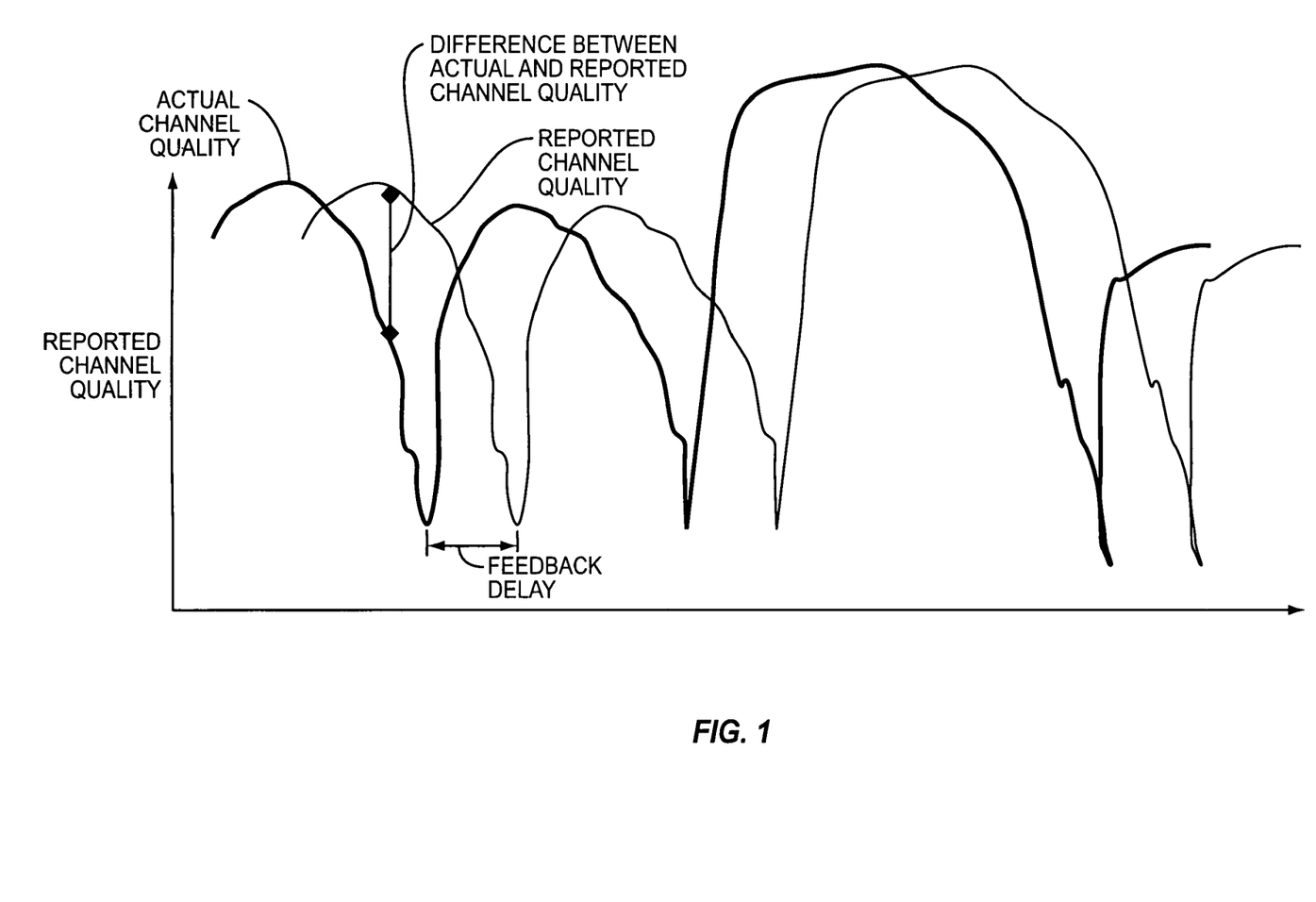
FIG. 1 is a graph illustrating the differences between actual channel conditions and estimates of channel conditions reported to a transmitter by a receiver.

With reference to FIG. 1, a graph is provided to illustrate the potential differences between actual channel quality and reported channel quality provided via feedback from the receiver. The delay associated with the feedback may result in significant differences between the actual and reported channel qualities, as noted above.

In addition to the unreliability of channel quality estimates fed back from a receiver due to delay, there is significant complexity associated with accurately measuring channel quality and providing channel quality estimates to the transmitter. When channel quality estimates are determined for the forward link from a base station to a mobile terminal, the reverse link design for providing channel quality estimates and feeding these estimates back to the base station adds complexity and cost to the design of the mobile terminal and the base station. Accordingly, there is a need to control modulation and coding for higher speed wireless communication networks while minimizing or eliminating the reliance upon channel quality estimates, which are measured by the receiver and fed back to the transmitter to control coding and modulation schemes.

SUMMARY OF THE INVENTION

The present invention provides a unique feedback system in a wireless communication system wherein the transmission channel is always overloaded with data, which is configured and modulated at a select order of modulation. Based on the channel conditions, only a portion of the data can be successfully received. As such, the receiver will attempt to receive the data using demodulation techniques corresponding to the different levels of modulation used to encode the data transmitted. The receiver will determine the data that is recovered, or the highest order of modulation at which the data is recovered, and provide feedback to the transmitter. The transmitter will then retransmit the data that was not properly received. By overloading the channel at all times, the maximum amount of data capable of being transmitted over the channel is optimized without requiring or heavily relying on the receiver feeding back channel condition information to the transmitter.

In one embodiment, groups of data, such as packets of data, are selectively associated with different levels of modulation based on priority. Lower orders of modulation, which are associated with more robust communication schemes, are associated with the higher priority data, and vice versa. The transmitter transmits the data using the highest modulation technique selected, and thus transmits the various groups of data at progressively higher levels of modulation. The receiver will decode and demodulate as much data as possible, and request retransmission of data not properly received. Those skilled in the art will recognize that there are many techniques for requesting retransmission of the lost data. For example, the receiver may identify the data that was actually received, the data that should have been received, or the modulation layers that were successful or unsuccessful, and feed such information back to the transmitter. The transmitter can process the information to derive the lost data and effect retransmission. Further, retransmission may take place by simply prioritizing and retransmitting the data alone or in conjunction with other data for retransmission or new data to be transmitted.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention eliminates, or at least minimizes, the need for a receiver to transmit channel quality information to the transmitter to allow the transmitter to control coding and modulation schemes. Instead of relying on channel quality information fed back from the receiver, the transmitter hierarchically layers data at ever-increasing coding rates and higher speed modulation techniques. In essence, the transmission channel is always overloaded with data to fully utilize the instantaneous channel capacity; however, only a portion of the transmitted data will be received successfully at the receiver. The receiver identifies the properly received data and provides information back to the transmitter to have the transmitter retransmit any data that was not received. Thus, the present invention does not require channel condition information determined by the receiver and fed back to the transmitter. Over time, the receiver and transmitter may cooperate with one another to select the highest probable coding and modulation techniques to avoid continuously trying to transmit data coding and modulation techniques that are not conducive to transmission given channel conditions.

Figure 2:
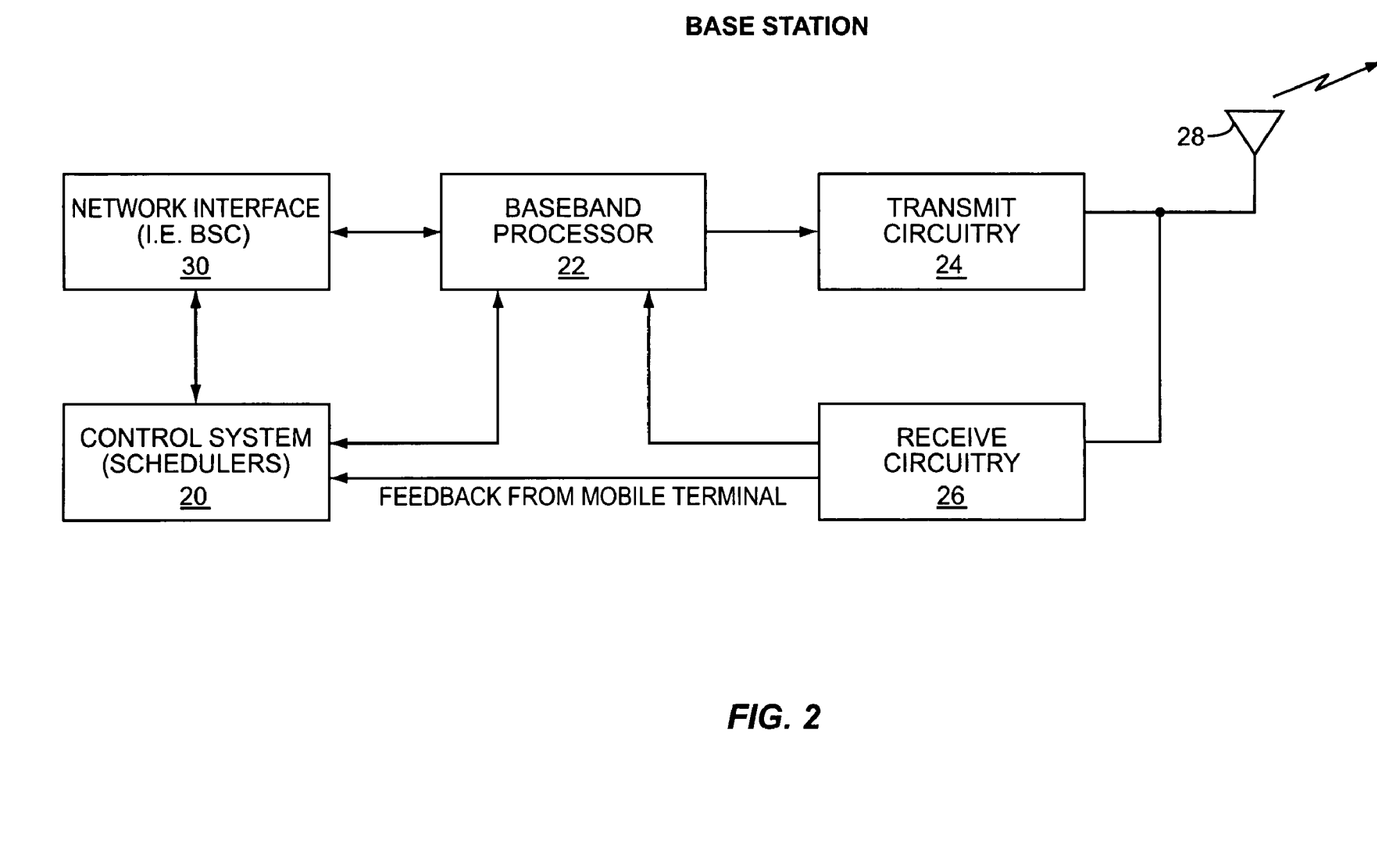
FIG. 2 is a block representation of a base station constructed according to one embodiment of the present invention.

A high level overview of the mobile terminals and base stations of the present invention is provided prior to delving into the structural and functional details of the preferred embodiments. With reference to FIG. 2, a base station configured according to one embodiment of the present invention is illustrated. The base station generally includes a control system 20, a baseband processor 22, transmit circuitry 24, receive circuitry 26, multiple antennas 28, and a network interface 30. The receive circuitry 26 receives radio frequency signals through antennas 28 bearing information from one or more remote transmitters provided by mobile terminals (illustrated in FIG. 3). Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The received information may include data and control information. For the present invention, the mobile terminal will provide feedback reporting the extent of which information transmitted from the base station is properly received at the mobile terminal. The receive circuitry 26 will recover the information fed back to the base station and provide it to the control system 20 for processing as will be described in detail further below.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) and application specific integrated circuits (ASICs). The received information is then sent across a wireless network via the network interface 30 or transmitted to another mobile terminal serviced by the base station. The network interface 30 will typically interact with a base station controller and a circuit-switched network forming a part of a wireless network, which may be coupled to the public switched telephone network (PSTN).

On the transmit side, the baseband processor 22 receives digitized data, which may represent voice, data, video, or control information, from the network interface 30, and encodes the data for transmission. The data may include data being transmitted for the first time or that being retransmitted due to failed reception at the mobile terminal. As will be discussed below, retransmitted data may be transmitted alone or integrally with new data depending on the transmission protocol.

For transmission, the encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to one or more antennas 28 through a matching network (not shown).

Figure 3:
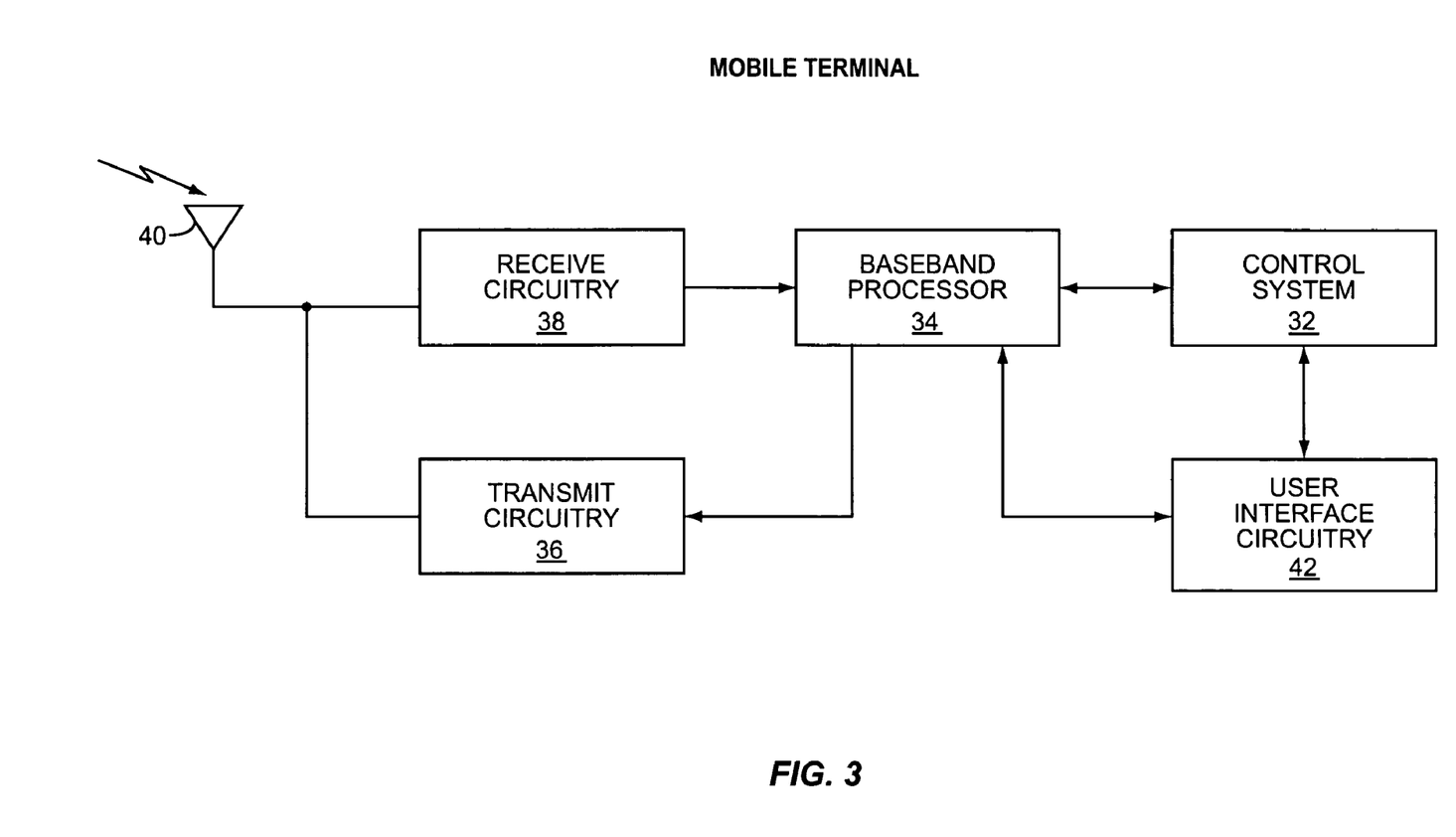
FIG. 3 is a block representation of a mobile terminal constructed according to one embodiment of the present invention.

With reference to FIG. 3, a mobile terminal configured according to one embodiment of the present invention is illustrated. Similarly to the base station, the mobile terminal will include a control system 32, a baseband processor 34, transmit circuitry 36, receive circuitry 38, one or more antennas 40, and user interface circuitry 42. The receive circuitry 38 receives radio frequency signals through antenna 40 bearing information from one or more base stations. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. As will be discussed in greater detail below, the baseband processor 34 and control system 32 will act individually or in cooperation to provide feedback via a retransmission protocol sufficient to allow the base station to identify data lost during a transmission attempt and retransmit the data. The baseband processor 34 is generally implemented in one or more digital signal processors (DSPs) and application specific integrated circuits (ASICs).

For transmission, the baseband processor 34 receives digitized data, which may represent voice, data, video, or control information, from the control system 32, which it encodes for transmission. The control information will include the feedback information supporting the retransmission of lost data. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to one or more antennas 40 through a matching network (not shown). A similar arrangement to that depicted in FIG. 2 and FIG. 3 for the downlink transmission can be also applied to uplink transmission.

Figure 4:
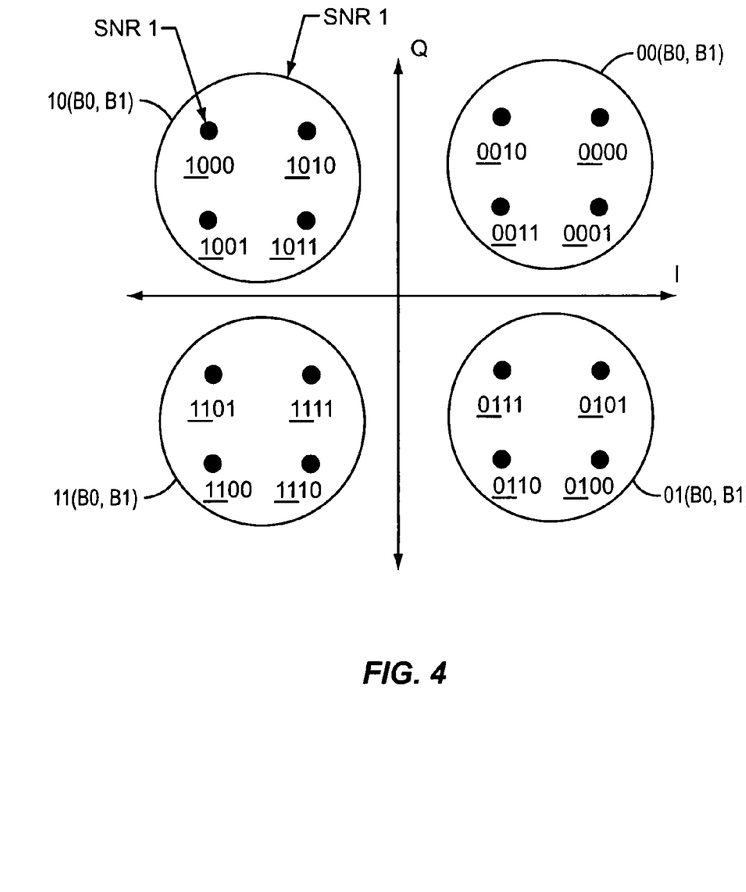
FIG. 4 is a representation of a quadrature-based constellation using a hierarchical modulation scheme according to one embodiment of the present invention.

As noted above, the present invention incorporates a hierarchical coding and modulation scheme, wherein data is effectively mapped to different layers corresponding to increasing orders of quadrature amplitude modulation (QAM). For example, in a 16 QAM architecture, 4 bits of data may be mapped into 16 positions in a constellation, as illustrated in FIG. 4. Assuming that the 4 bits are B0, B1, B2, and B3, wherein B0 is the most significant bit and B3 is the least significant bit, bits B0 and B1 are modulated using QPSK modulation wherein each of the larger circles for each of the four quadrants represents one of the four possible symbols for the two most significant bits B0 and B1. Similarly, the least significant bits B2 and B3 are coded and modulated for 16 QAM. As such, if channel conditions are such that only QPSK modulation is receivable, bits B0 and B1 may be recovered using QPSK demodulation. If channel conditions are good enough to support 16 QAM, bits B0-B3 may be recovered. In essence, the coding and modulation scheme is progressively layered wherein as channel conditions increase, additional layers of data may be uncovered using more complex coding and modulation techniques.

Figure 5:
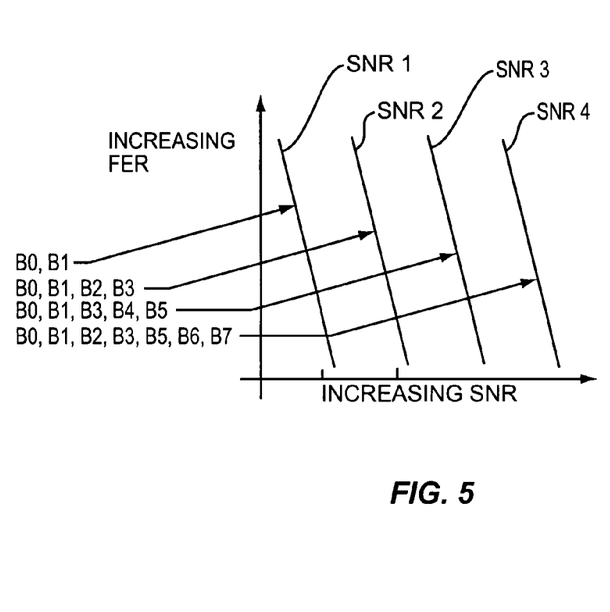
FIG. 5 is a graph illustrating layered coding and modulation schemes according to one embodiment of the present invention.

With reference to FIG. 5, a graph is provided illustrating the various signal-to-noise ratios (SNRs) and the effective, layered modulation coding set corresponding to each of the increasing signal-to-noise ratios. As the signal-to-noise ratio improves, higher order QAM modulation techniques become available. In essence, higher ordered modulation techniques transmit more data and the associated coding must provide larger amounts of data corresponding to the modulation scheme. Thus, coding is typically a function of the type of modulation. The progressive, layered modulation coding scheme of the present invention essentially codes and modulates data in a hierarchical format, wherein progressive layers of bits are associated with corresponding orders of modulation. In general, data is encoded and modulated throughout multiple layers and the receiver simply attempts to demodulate and decode the data at the highest layer possible. Thus, select data will be recovered and other data will be lost. For example, the receiver will be able to determine directly or indirectly the data that was received or lost and feed that information back to the transmitter, which will identify the data lost and retransmit the lost data using a desired retransmission scheme. The retransmission schemes may include simply retransmitting the lost data, or puncturing the lost data into new data to be transmitted.

Figure 6:
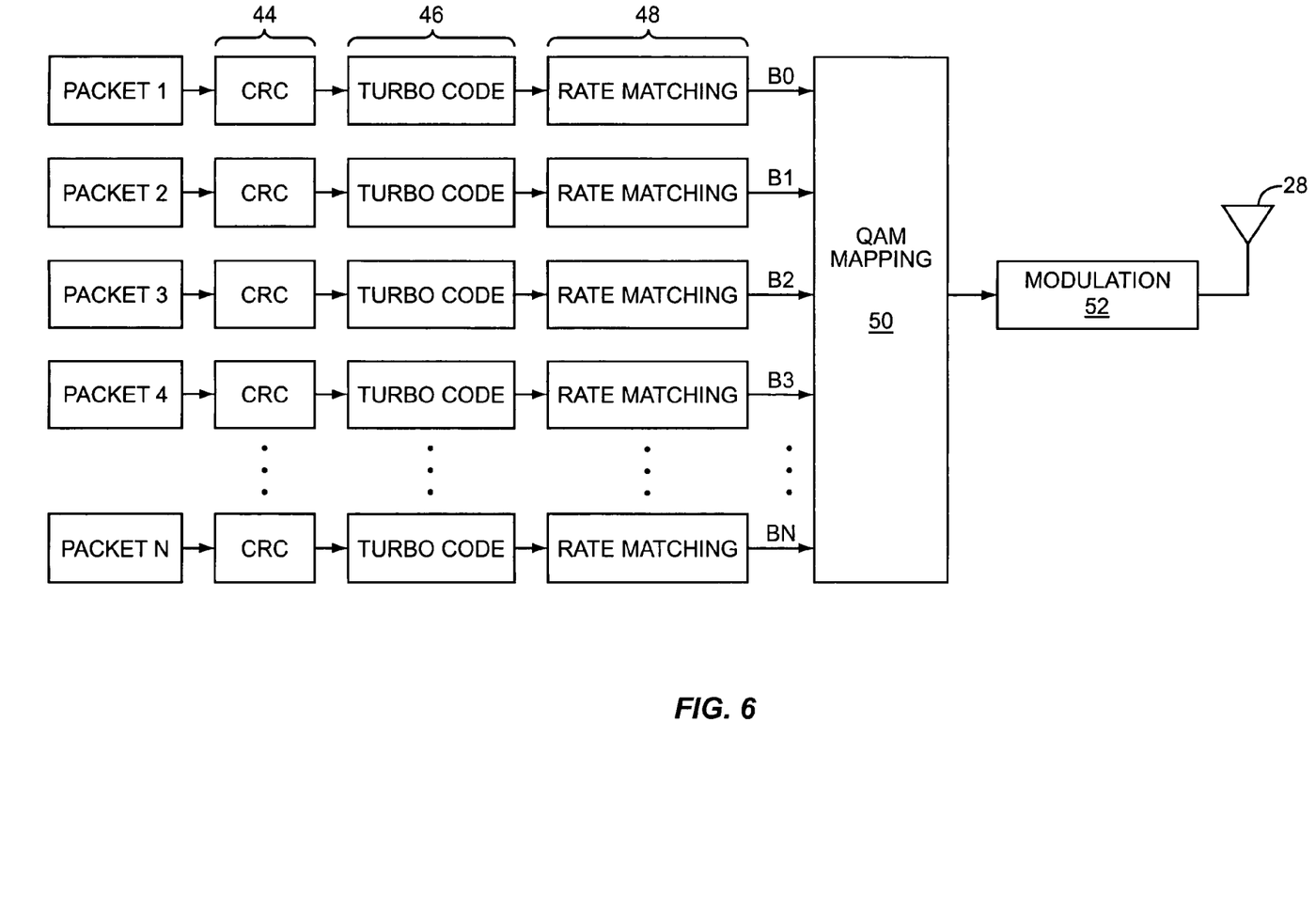
FIG. 6 is a block representation of a transmitter in the base station of FIG. 2 according to one embodiment of the present invention.

An exemplary transmitter architecture for a base station is illustrated in FIG. 6. Assume initially that packets 1 through N are scheduled with packet 1 having the highest priority and packet N having the lowest priority. Each packet is provided to a cyclic redundancy check (CRC) function 44 to provide a cyclic redundancy check prior to encoding, preferably by a turbo coding function 46. The resultant data is sent to a rate matching function 48 to effectively match the data rate to the modulation order. In the illustrated example, the data from packet 1 are transmitted using the most significant bit B0, wherein the data for packet N are transmitted using the least significant bit BN. The data for the packets therebetween are progressively layered for relative importance. The data from each of the packets are sent to a QAM mapping function 50, which will essentially map each of the bits B0-BN according to $2^N$ QAM mapping. The resultant data is modulated by modulation function 52 and transmitted via antenna 28 to the mobile terminal.

Figure 7:
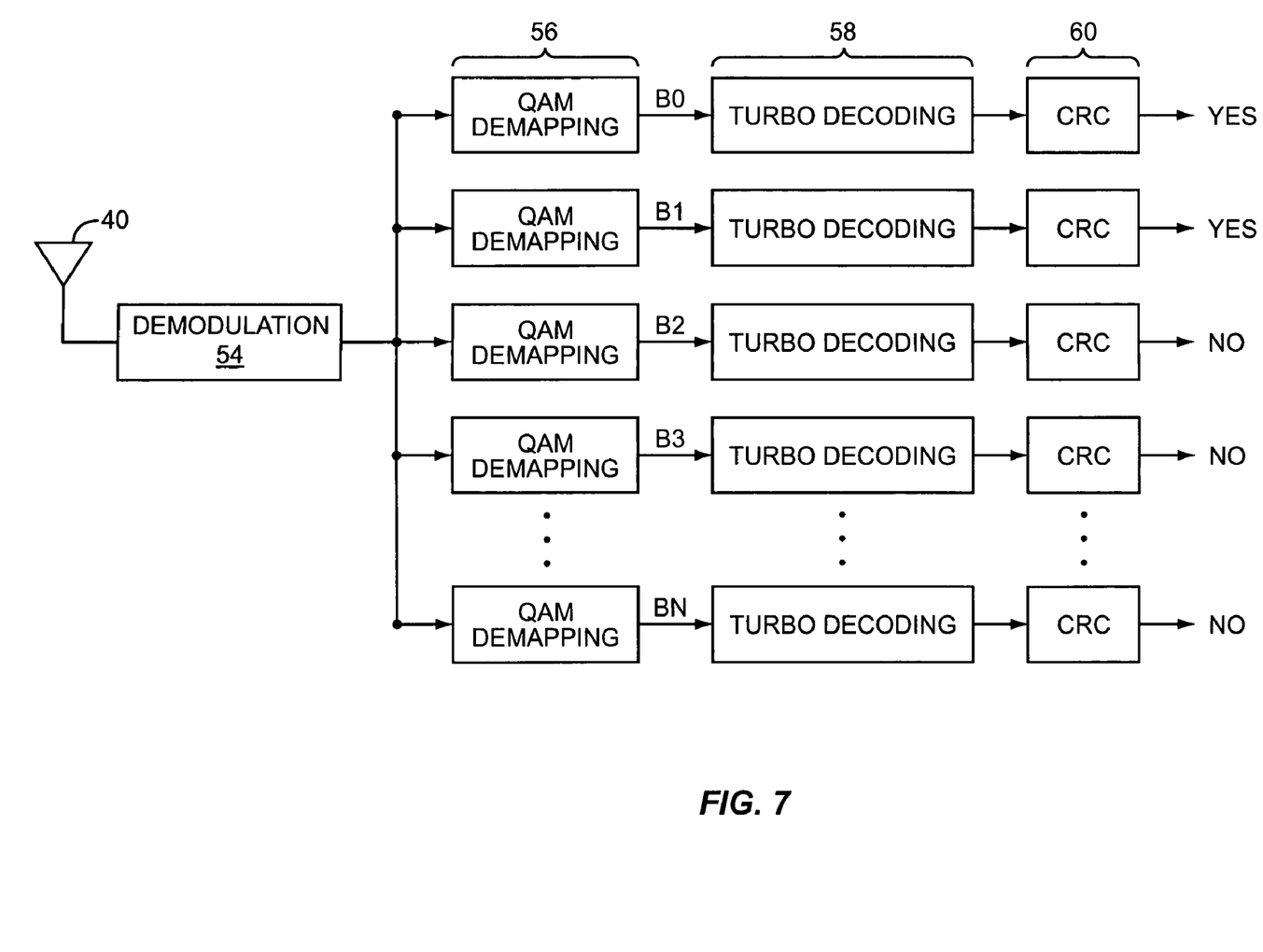
FIG. 7 is a block representation of a receiver in the mobile terminal of FIG. 3 according to one embodiment of the present invention.

As illustrated in FIG. 7, the mobile terminal will receive the data via antenna 40 and demodulate the data using a demodulation function 54. The demodulated signals are sent to corresponding QAM demapping functions 56 corresponding to the various layers in the progressive layered modulation scheme. Accordingly, attempts to demap the information from the demodulation function 54 are made at each of the $2^N$ QAM orders. For each modulation order, the resultant data are decoded, preferably using a Turbo decoding function 58, and a cyclic redundancy check is provided by using a CRC function 60 to determine if the data at each of the given orders was properly received. In most cases, channel conditions are sufficiently degraded wherein information modulated at one or more of the higher modulation orders will not be properly received. In FIG. 7, only the first two layers corresponding to bits B0 and B1 are properly received, and all other bits corresponding to the higher modulation layers are not properly received. In this case, the mobile terminal will identify the layers or data therein that was properly received, or will identify the fact that other layers were not properly received, and feed this information back to the transmitter to trigger retransmission of the lost data.

Figure 8:
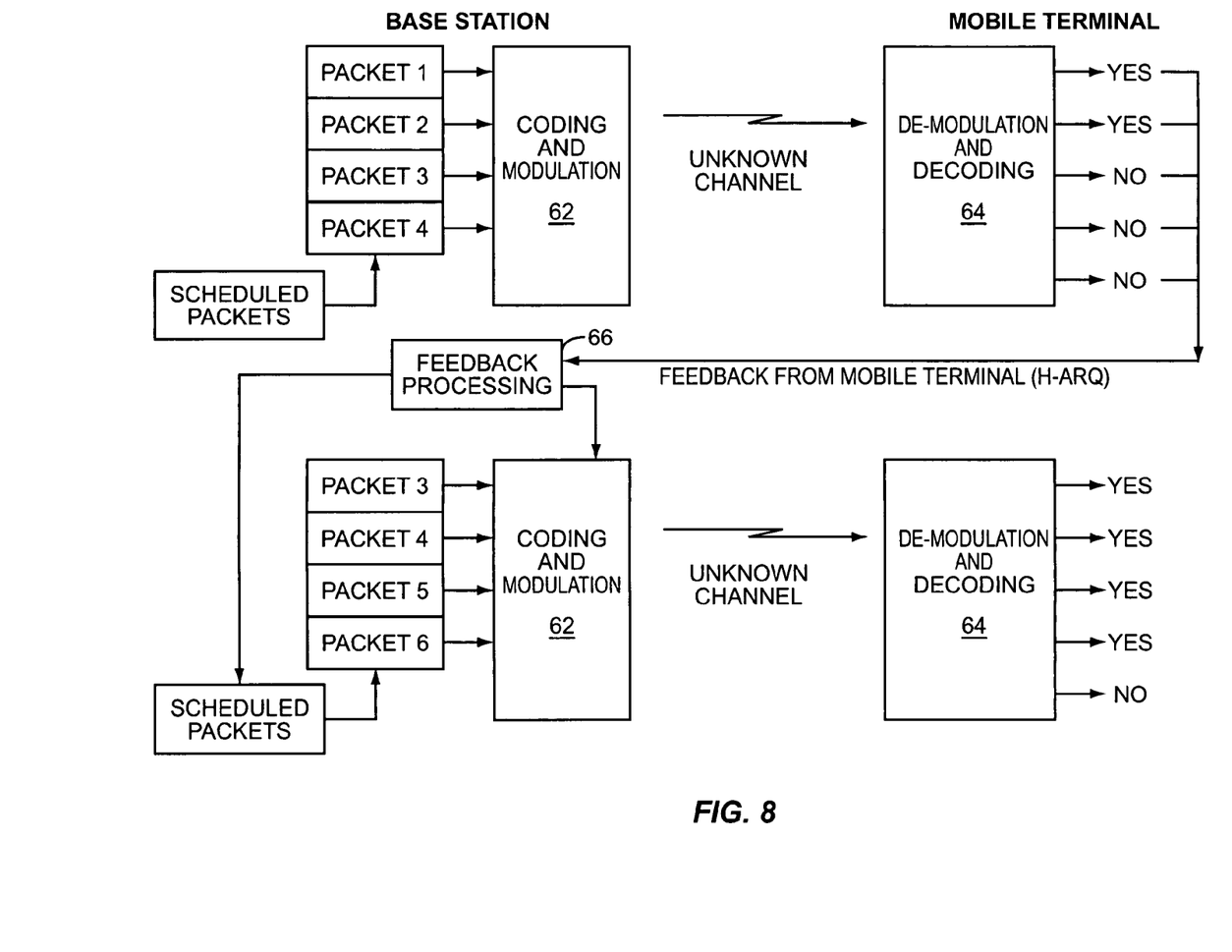
FIG. 8 is a block representation of a feedback loop controlling modulation and coding according to one embodiment of the present invention.

An exemplary flow is illustrated in FIG. 8, wherein a series of packets (PACKET 1 through PACKET 4) is scheduled to be transmitted from the base station to the mobile terminal. Data from the packets are provided to a coding and modulation function 62 according to progressive layers associated with packet priority. Information from each of the packets is transmitted in the progressively modulated layer to the mobile terminal, which will attempt to demodulate and decode each of the associated layers. The mobile terminal will determine that the two most significant bits, which are those associated with packets 1 and 2, were properly received, and those for the least significant bits, bits associated with packets 3 and 4, were not properly received. The mobile terminal will preferably use some type of automatic retransmission request (ARQ) protocol to signal the base station that the data for packets 3 and 4 were not properly received, or that the data for packets 1 and 2 were properly received. A feedback processing function 66 will effectively schedule packets 3 and 4 at the more robust coding and modulation layers and transmit data from new packets 5 and 6 at the less robust transmission layers, which are capable of transmitting data at high rates. During this transmission, the mobile terminal is successful in decoding the data from each of the four packets.

Although various types of protocols exist that allow the receiver to inform the transmitter that certain packets were either not received or were corrupted, ARQ-based systems will transmit an acknowledgement (ACK) from the receiver to the transmitter for each packet that is properly received, and send a negative-acknowledgement (NAK) when the receiver is unable to properly recover a packet. The term hybrid ARQ (HARQ) is used when the packets are encoded to facilitate error correction at the receiver.

The present invention incorporates a hierarchical modulation rule, wherein multiple groups of data are mapped into different QAM layers, such that data in higher priority groups are associated with a more robust modulation scheme and those associated with a lower priority are associated with a less robust yet higher capacity modulation scheme. In essence, the channel is always overloaded with data, and only the data capable of being demodulated is received and the portion not received is retransmitted. In order to minimize the potential for wasting resources, the mobile terminal can determine over time the maximum, reasonable modulation layer and signal the base station to cap its hierarchical modulation scheme at the most reasonable layer so that very high data rate modulate schemes will not be used if they are never successful. Notably, when channel conditions are good, there is a significant amount of data in the channel to be recovered. If the channel is poor, the receiver recovers what it can and signals the transmitter to retransmit that which was not received.

Notably, the present invention avoids the need for and reliance on channel quality measurements fed back from the receiver to the transmitter, thus, there is no concern that the channel information fed back from the receiver has become obsolete due to significant changes in the channel since its quality was measured, measurement error at the receiver side, or errors caused by the feedback channel. By overloading the channel and not relying on channel quality estimates fed back from the receiver for transmission, the receiver is put in the position to recover as much data as possible at any given time to maximize transmission rates and optimize use of the channel.

The set-up of highest order of QAM modulation and coding rates for each layer can be determined by long term channel quality directly measured at the mobile terminal and feedback to the base station through the up link, or the base station can indirectly measure the long term channel quality of the terminal from the received up-link signal.

Those skilled in the art will recognize improvements and modifications to the preferred embodiments of the present invention. All such improvements and modifications are considered within the scope of the concepts disclosed herein and the claims that follow.

What is claimed is:

1. A method for facilitating communication with a terminal comprising:
   associating a plurality of groups of data with a corresponding plurality of modulation orders to form data wherein more significant groups of data are associated with lower modulation orders and less significant groups of data are associated with higher modulation orders, wherein the higher modulation orders include a highest order of modulation; and
   transmitting the data, wherein the highest order of modulation is used during data transmission,
   wherein each of the plurality of groups of data is associated with a unique packet scheduled for transmission and the lower modulation orders are for those packets having a higher priority.

2. The method of claim 1 wherein one of the plurality of modulation orders is quadrature amplitude modulation.

3. The method of claim 2 wherein the plurality of modulation orders range from quadrature phase shift keying to $2^n$ quadrature amplitude modulation.

4. The method of claim 1, further comprising:
   identifying the data not received; and
   retransmitting the data not received, wherein the data being retransmitted is punctured into the data being transmitted.

5. A method for facilitating communication with a base station wherein the base station associates a plurality of groups of data with a corresponding plurality of modulation orders to form data wherein more significant groups of data are associated with lower modulation orders and less significant groups of data are associated with higher modulation orders and transmits the data, wherein a highest order of modulation is used during data transmission, the method comprising attempting to receive the data at each of the plurality of modulation orders, wherein each of the plurality of groups of data is associated with a unique packet scheduled for transmission and the lower modulation orders are for those packets having a higher priority.

6. The method of claim 5 wherein one of the plurality of modulation orders is quadrature amplitude modulation.

7. The method of claim 6 wherein the plurality of modulation orders range from quadrature phase shift keying to $2^n$ quadrature amplitude modulation.

8. The method of claim 5 wherein data being retransmitted from the base station is punctured into new data being transmitted from the base station.

9. A method for facilitating communication with a base station wherein the base station associates a plurality of groups of data with a corresponding plurality of modulation orders to form data wherein more significant groups of data are associated with lower modulation orders and less significant groups of data are associated with higher modulation orders and transmits the data, wherein a highest order of modulation is used during data transmission, the method comprising attempting to receive the data at each of the plurality of modulation orders and determining the highest of the plurality of modulation orders based on historical performance and transmitting information indicative of the highest of the plurality of modulation orders to the base station.

10. An apparatus for facilitating communication with a terminal comprising control circuitry, receive circuitry and transmit circuitry cooperatively adapted to:
    associate a plurality of groups of data with a corresponding plurality of modulation orders to form data wherein more significant groups of data are associated with lower modulation orders and less significant groups of data are associated with higher modulation orders; and
    transmit the data, wherein a highest order of modulation is used during data transmission,
    wherein each of the plurality of groups of data is associated with a unique packet scheduled for transmission and the lower modulation orders are for those packets having a higher priority.

11. The apparatus of claim 10 wherein one of the plurality of modulation orders is quadrature amplitude modulation.

12. The apparatus of claim 11 wherein the plurality of modulation orders range from quadrature phase shift keying to $2^n$ quadrature amplitude modulation.

13. The apparatus of claim 10 wherein the data retransmitted is punctured into the data being transmitted.

14. The apparatus of claim 10 wherein the control circuitry is further adapted to:
    a) receive feedback from the mobile terminal indicative of data not received by the mobile terminal; and
    b) control the highest of the plurality of modulation orders based on the feedback.

15. An apparatus for facilitating communication with a base station wherein the base station associates a plurality of groups of data with a corresponding plurality of modulation orders to form data wherein more significant groups of data are associated with lower modulation orders and less significant groups of data are associated with higher modulation orders and transmits the data, wherein a highest order of modulation is used during data transmission, the apparatus comprising control circuitry, receive circuitry and transmit circuitry cooperatively adapted to attempt to receive the data at each of the plurality of modulation orders, wherein each of the plurality of groups of data is associated with a unique packet scheduled for transmission and the lower modulation orders are for those packets having a higher priority.

16. The apparatus of claim 15 wherein one of the plurality of modulation orders is quadrature amplitude modulation.

17. The apparatus of claim 16 wherein the plurality of modulation orders range from quadrature phase shift keying to $2^n$ quadrature amplitude modulation.

18. The apparatus of claim 15 wherein data being retransmitted from the base station is punctured into new data being transmitted from the base station.

19. The apparatus of claim 15 wherein the control circuitry, receive circuitry, and transmit circuitry are further cooperatively adapted to generate feedback indicative of the data not received where the feedback is provided according to an automated retransmission request protocol.

20. The apparatus of claim 15 further comprising determining the highest of the plurality of modulation orders based on historical performance and transmitting information indicative of the highest of the plurality of modulation orders to the base station.

* * * * *